United States Patent [19]

Knight

[11] 4,050,743

[45] Sept. 27, 1977

[54] LOAD DEPENDENT CONTROL ARRANGEMENTS

[75] Inventor: David John Knight, Bath, England

[73] Assignee: Bendix Westinghouse Limited, Bristol, England

[21] Appl. No.: 689,213

[22] Filed: May 24, 1976

[30] Foreign Application Priority Data

June 3, 1975    United Kingdom ............... 23941/75

[51] Int. Cl.² ............................................. B60T 8/18
[52] U.S. Cl. .................................... 303/22 R; 303/40; 303/118
[58] Field of Search .......................................... 303/2–3, 303/15, 20, 22 A, 22 R, 118, 119, 23 A, 23 R, 40, 28, 61, 59, 68–69; 188/195, 181 R, 181 A; 137/82; 251/30

[56] References Cited

U.S. PATENT DOCUMENTS

| | | | |
|---|---|---|---|
| 3,503,656 | 3/1970 | Shattock et al. ................... | 303/22 R |
| 3,685,868 | 8/1972 | Nagase et al. ...................... | 303/22 R |
| 3,920,285 | 11/1975 | Maskery ............................. | 303/22 R |
| 3,944,287 | 3/1976 | Nagase ............................... | 303/22 R |
| 3,970,348 | 7/1976 | Maskery ............................. | 303/22 R |

*Primary Examiner*—Trygve M. Blix
*Assistant Examiner*—Douglas C. Butler
*Attorney, Agent, or Firm*—Ken C. Decker; William N. Antonis

[57] ABSTRACT

A load dependent control arrangement wherein an electrical load sensor such as a strain gauge controls the mark-to-space ratio of a pulse train output from a pulse generator. The pulse train operates a solenoid valve to control a pneumatic output pressure in proportion to the ratio of marks to spaces. The output pressure may be amplified in a self-lapping pneumatic relay valve. The final output pressure may be utilized in any suitable manner, for example, in operating the pneumatic brakes of a vehicle whose load is being measured by the sensor.

32 Claims, 3 Drawing Figures

LOAD DEPENDENT CONTROL ARRANGEMENTS

This invention relates to load dependent control arrangements, and more particularly but not exclusively to such arrangements constructed or adapted for load dependent control of vehicle braking.

It is desirable to limit the maximum braking force applicable to a road or raid vehicle in accordance with the load on the vehicle, in order to take advantage of the maximum adhesion available, i.e., the higher the load, the greater can be the braking effort without wheel slide. Previously proposed arrangements for achieving this object have for example comprised pneumatic pressure limiting or ratioing valves actuated by the vehicle's suspension spring deflection under load, the greater the spring deflection, the greater being the maximum air pressure applicable to the vehicle's pneumatic brakes. However, such prior arrangements suffer from the disadvantage of requiring mechanical linkages between the sprung and unsprung parts of the vehicle, with attendant problems of reliability, maintainance, and accuracy of effect. Similar problems arise in non-vehicular applications where a control effect requires to be load dependent.

According to a first aspect of the invention, there is provided a load dependent control arrangement comprising load-responsive means for controlling the mark-to-space ratio of pulses of fluid pressure delivered as a control output, the load-responsive means being responsive to the load to vary the mark-to-space ratio in dependence upon the magnitude of the load whereby the mean pressure of said control output is varied in dependence upon the magnitude of the load.

Said mean pressure may be controlled to be proportional to the magnitude of the load. The fluid may be a gas, and may be air. The arrangement may include fluid pressure power amplifier means, preferably in the form of a self-lapping relay valve, coupled to receive the fluid pressure delivered as said control output and to amplify the fluid power of said control output. The load-responsive means is preferably responsive to the load by being coupled to a load sensor means included in the arrangement, the load sensor means preferably taking the form of a stress or strain to electrical transducer capable of producing or modifying an electrical signal in dependence on the load, and, for example, taking the form of one or more strain gauges attached to the load or a support means for the load.

According to a second aspect of the invention, there is provided a load dependent control arrangement, comprising transducer means coupled in use to sense the magnitude of the load and to produce or modify an analogue electrical signal in dependence upon the magnitude of the load, and electric signal to fluid pressure conversion means coupled to the transducer means to convert in use the electrical signal therefrom to a fluid pressure whose magnitude is dependent upon the magnitude of the electrical signal, whereby said fluid pressure may exercise control of fluid pressure responsive means in dependence upon the magnitude of the load.

The said dependencies of the transducer means and of the conversion means may in either or both cases be proportional dependence. The said fluid may be a gas, and may be air. The arrangement may include a fluid pressure amplifier means coupled to the output of the conversion means to amplify the fluid power of the output thereof, said amplifier means preferably taking the form of a self-lapping relay valve. The conversion means may comprise analogue to binary converter means for converting in use the analogue electric signal to a binary signal in the form of a train of pulses having a mark-to-space ratio varying in dependence upon, preferably in proportion to, the magnitude of the analogue signal, and electro-magnetically operable fluid valve means responsive in use to the train of pulses to pass or block flow or fluid constituting the output of the conversion means. The valve means preferably passes fluid upon a mark occurring in the train of pulses and blocks fluid flow during the intervening spaces, but may work in inverse fashion. Preferably the conversion means includes fluid pulsation damping means, for example in the form of fluid capacity where the fluid is elastic, e.g., a gas.

The arrangements of the first and second aspects of the invention may be adapted to controlling braking of vehicles whose brakes are directly or indirectly applied by fluid pressure, by way of sensing the loading of a vehicle and modifying the braking pressure set by the vehicle's driver in dependence on the load, preferably so as to minimise or prevent skidding.

According to a third aspect of the invention, there is provided a load dependent control arrangement constructed or adapted to function as or form part of a variable load dependent vehicle braking system, said system including a brake control valve operable to produce a control fluid pressure dependent upon a desired degree of braking, a relay valve responsive to the output of the brake control valve for deriving from a source of input fluid pressure, an output pressure dependent on the control pressure, and wherein load sensing transducer means are provided operable to provide a variable duty ratio signal indicative of loading of the vehicle and a duty ratio valve being provided between the said control valve and the relay valve being operable in response to the duty ratio signal to adjust the duty ratio of a fluid flow connection between the control valve and the relay valve.

The fluid may be a gas, for example, air.

According to a fourth aspect of the invention, there is provided a load dependent control arrangement constructed or adapted to function as or form part of a vehicle braking apparatus, said apparatus including relay valve means for relaying to a brake actuator a fluid pressure which bears a predetermined relationship to the pressure in a control chamber of the relay valve means and wherein load sensing means is provided for varying the mark-to-space ratio of pulses of fluid pressure delivered to the control chamber according to the vehicle loading, said pressure representing a desired degree of vehicle braking.

The fluid may be a gas, for example, air.

In order that the invention may be more clearly understood and readily put into effect, a preferred embodiment of the same will now be described by way of example with reference to the accompanying drawings wherein.

Figure 1:
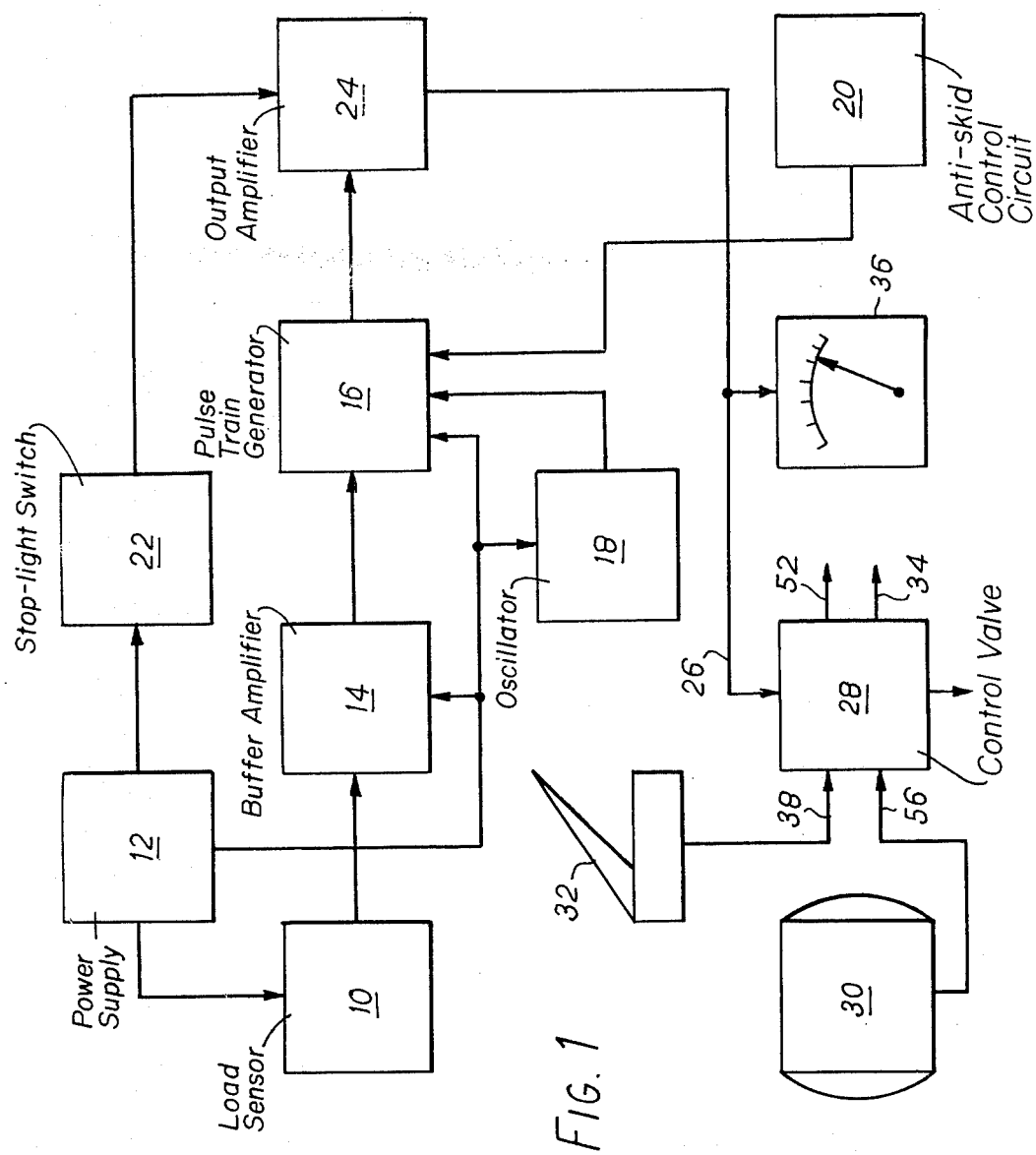
FIG. 1 illustrates a block schematic diagram of the embodiment.

Referring to the drawings, the embodiment shown in FIG. 1 is a load dependent control arrangement applied to the pneumatic service braking system of a road vehicle such as a lorry. (The arrangement could also be applied to a secondary braking system). A load sensor 10 in the form of a strain gauge or strain gauge bridge is secured to an axle of the vehicle (preferably the axle most heavily influenced by variation of loading of the vehicle) and produces a strain-dependent variable analogue electric voltage using a suitable electric power supply 12, such as the vehicle's battery or more preferably a stabilised power supply supplied from the battery. The voltage from the load sensor 10 is amplified in a buffer amplifier 14 and passes as an analogue control signal to an analogue signal to variable mark-to-space ratio pulse train generator 16. The pulse train output of the generator 16 is derived from an oscillatory signal input provided by an oscillator 18, preferably having a frequency in the range from 20 to 40 hertz. The variation of mark-to-space ratio of the pulses in the output of the generator 16 may be achieved in any known manner, for example, by making the input signal from the oscillator 18 have a sawtooth waveform, comparing the instantaneous magnitudes of the sawtooth signal and the analogue control signal from the amplifier 14, and switching the output voltage level of the generator 16 between its binary levels upon each crossover of the compared signals. The generator 16 (and oscillator 18) may be considered as, or constituted by, a class D amplifier.

As an optional extra, the mark-to-space ratio of the output pulse train from the generator 16 may be modified or entirely overridden by a suitable antiskid control signal from an anti-skid control circuit 20, functioning for example by sensing excessive wheel deceleration, thereby temporarily to reduce or terminate braking.

Upon commencement of braking, a conventional brake stop light switch 22 is closed in known manner, either by direct actuation by the brake pedal or by air pressure rise in the service brake pipe, and applies power from the supply 12 to an output amplifier 24. Thereby the pulse train from the generator 16 is suitably amplified and applied via lead 26 to a control valve 28 (which will be subsequently described in detail with reference to FIG. 2). Apart from the electrical input via 26, the valve 28 receives two pneumatic inputs, firstly high pressure air from a main service braking air reservoir 30 and secondly a variable pressure pneumatic control signal whose magnitude is determined by the extent of depression of a conventional driver's foot brake pedal 32 and which represents the degree of vehicle braking desired by the driver. The valve 28 includes a conventional relay valve which amplifies the pneumatic signal from the pedal 32 by controlling in known manner the pressure of air delivered from the reservoir 30 to an output 34 and thence to the service brake cylinders (not shown). The electrical pulse train on the lead 26 has the effect of rapidly opening and shutting an electromagnetically operated valve also included within the valve 28 so as correspondingly to vary the mean value of the pressure from the pedal 32 delivered to the control side of the relay valve, i.e., the mark-to-space ratio of the pulse train proportions the demanded braking level, which is thus affected by the sensed vehicle load. Thereby load dependent variation of vehicle braking is achieved.

As an optional extra, a meter 36 may be coupled to the lead 26 and located on the driver's instrument panel, the meter 36 being responsive to the mean voltage on the lead 26 or to the mark-to-space ratio of the pulses in such a manner as to indicate to the driver the sensed vehicle load, preferably as the proportion of gross vehicle tonnage in excess of the tare weight.

Figure 2:
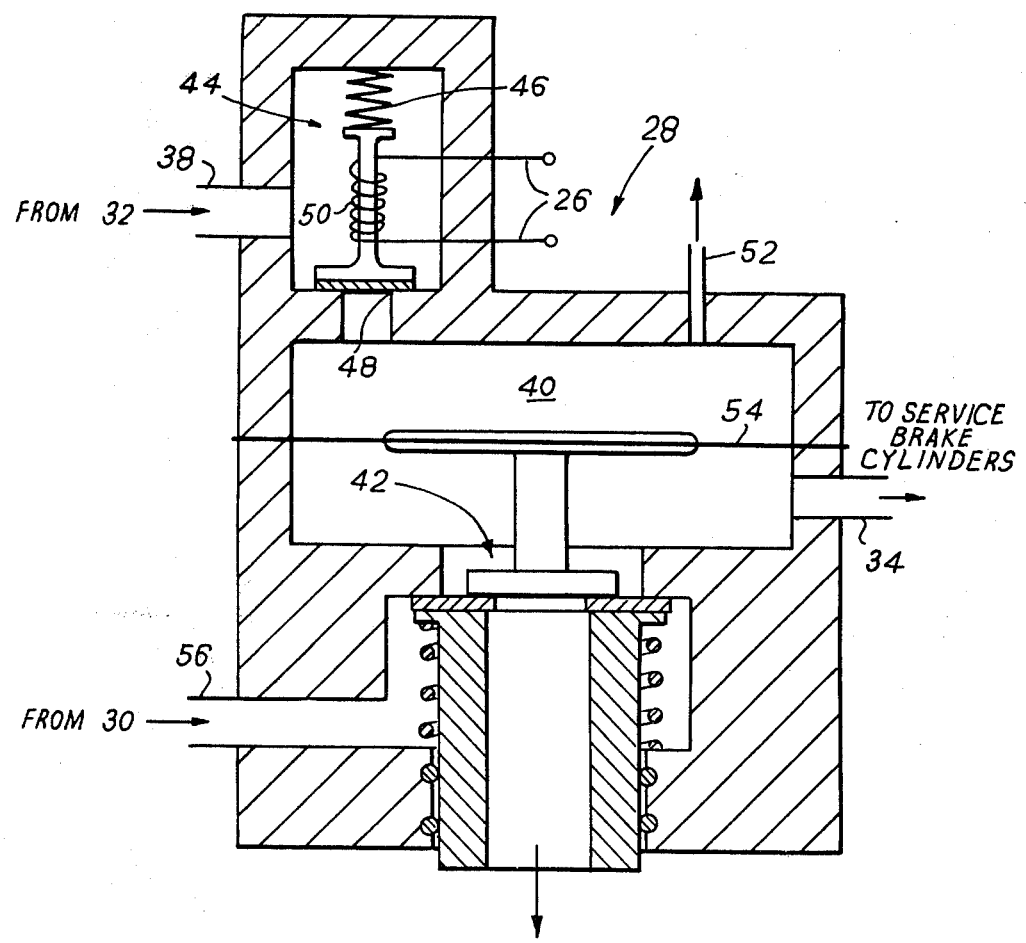
FIG. 2 is a semi-schematic cross-section of a part of the embodiment.

Referring now to FIG. 2, this is a schematic illustration, in cross-section, of the internal details of the valve 28 (in simplified form for the purpose of explanation only). The control pressure from the pedal 32 is received at an input port 38, and its passage to the control chamber 40 of a relay valve 42 is permitted or prevented by the respective opening or closing of an electromagnetically operated valve 44. The valve 44 is biassed by a spring 46 to keep its valve seat 48 normally closed but a coil 50 energised by the pulses on the lead 26 can lift the valve 44 to open the seat 48 and let air pressure pass from the pedal 32 to the control chamber 40. (The valve 44 is shown in a highly schematic form, guides for its reciprocating movement have been omitted for clarity, and the actual form of the valve would be of a low inertia design suitable for operation at up to forty times per second).

Air at super-atmospheric pressure within the chamber 40 is slowly vented therefrom via an orifice 52 to the surrounding atmosphere. The capacity of the chamber 40 is sufficient substantially to smooth out the pulsations of incoming air yet not so large as to cause too slow a response of pressure within the chamber 40 to changes in the mark-to-space ratio on the lead 26 and/or the magnitude of the pressure delivered by the pedal 32.

The valve 42 is a conventional self-lapping relay valve, having a flexible rubber diaphragm 54 by which input pressure from the reservoir 30 and received at an inlet 56 is relayed in known manner to the outlet 34 in accordance with the pressure in the control chamber 40. (A piston may be used in place of the diaphragm 54).

A modification of the control valve 28 will now be described with reference to FIG. 3. (Parts of the FIG. 3 embodiment which correspond to the FIG. 2 embodiment are given the same reference numerals). The modified valve shown in FIG. 3 differs from that shown in FIG. 2 principally in that the orifice 52 is omitted and exhausting of the air from the chamber 40 is undertaken in a different manner. When the solenoid 50 is energised to admit air from the inlet port 38, the admitted air passes via the valve 48 to a passage 58 leading to a disc 60 of rubber or another elastic material. The admitted air causes the disc 60 to bow, becoming concave to the right as shown in the drawing. This opens a passage 62 to the admitted air from 38, and the admitted air thus passes to the control chamber 40 of the relay valve 42.

When the solenoid 50 is de-energised to close the valve 48, pressure to the left of the disc 60 drops. Because at the same time the pressure in the chamber 40 is acting on the right of the disc 60, the disc 60 again bows, becoming concave to the right, and the disc 60 lifts off an exhaust valve seat 63 while shutting off the passage 58. Thereby the chamber 40 is opened to atmosphere and the previously admitted air leaks away, dropping the pressure in the chamber 40 in readiness for the next admission of air.

Figure 3:
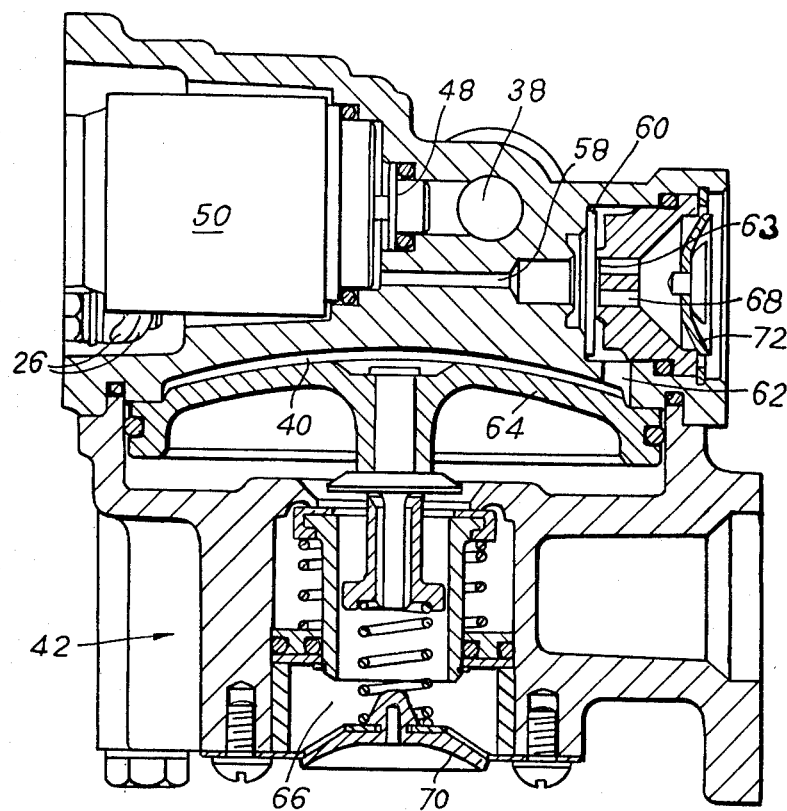
FIG. 3 shows a modification of the FIG. 2 arrangement.

Thus, whereas the air in the chamber 40 was continuously leaking to atmosphere (via the orifice 52) in the FIG. 2 embodiment, in the FIG. 3 embodiment the chamber 40 is exhausted to atmosphere only during spaces in the mark/space pulse train applied to the solenoid 50, but otherwise the FIG. 3 embodiment works as does the FIG. 2 embodiment.

Minor details by which the FIG. 3 embodiment differs from the FIG. 2 embodiment are the use of a piston 64 in place of the diaphragm 54, and the sealing of the relay valve exhaust port 66 and the control chamber exhaust port 68 by one-way rubber flap valves 70 and 72 respectively, so as to prevent the admission of contaminants such as dust and water which are commonly present in the working environment of a road vehicle.

Modifications and variations may be made in the above described arrangements, and the arrangements may be applied to load dependent control in situations other than vehicle braking. The working fluid may be a gas other than air, or the fluid may be a liquid. The relay valve 42 may be omitted in suitable cases, the output of the valve 44 passing directly to the brake cylinders or other means ultimately receiving the air.

Having thus described our invention what we claim is:

1. A load sensing arrangement comprising:
   load sensor means for generating an analogue electric signal dependent on a load;
   electric signal conversion means coupled to said load sensor means for converting said analogue signal to a binary signal having a mark-to-space ratio dependent on the magnitude of said analogue signal;
   electrically operated fluid valve means coupled to said conversion means to alternately open and close a fluid valve in accordance with the marks and spaces in said binary signal;
   a source of predetermined fluid pressure coupled to said fluid valve means to have said predetermined fluid pressure alternately passed and blocked by the opening and closing of said valve to produce an output of said fluid valve means which is dependent both on said predetermined pressure and on said load.

2. The arrangement of claim 1, wherein the load sensor means comprises a strain-to-electrical transducer capable of modifying an electrical signal in dependence on the load.

3. The arrangement of claim 2 wherein the dependency of said transducer on the load is proportional dependence.

4. The arrangement of claim 1 wherein said fluid is a gas.

5. The arrangement of claim 4 wherein said gas is air.

6. The arrangement of claim 1 including a fluid capacity coupled to the output of said fluid valve means to dampen fluctuations in the pressure of said output.

7. The arrangement of claim 1 including a fluid pressure amplifier means coupled to the output of the fluid valve means to amplify the fluid power of said output of said fluid valve means.

8. The arrangement of claim 7 wherein said fluid pressure amplifier means is a self-lapping relay valve.

9. The arrangement of claim 8 wherein said relay valve has a control volume coupled to receive the output of said fluid valve means, said control volume being dimensioned to present a fluid capacity for damping pressure fluctuations in the output of said fluid valve means.

10. The arrangement of claim 9 wherein said control volume has a restrictive atmospheric vent for providing a continuous restricted venting of said control volume to atmosphere.

11. The arrangement of claim 9 including a pressure sensitive valve means coupled to said fluid valve means and to said control volume for admitting pressurized fluid to said control volume when said fluid valve means is passing said predetermined pressure and for venting said control volume to atmosphere when said fluid valve means is blocking said predetermined pressure.

12. The arrangement of claim 1 wherein said electric signal conversion means is a class-D amplifier.

13. The arrangement of claim 1 wherein said electric signal conversion means comprises an oscillator means producing a sawtooth output waveform, comparison means for comparing the instantaneous magnitude of said sawtooth waveform with the instantaneous magnitude of the analogue signal from said load sensor means, and switching means for switching the output of said electric signal conversion means between one binary level and another binary level each time the instantaneous magnitude of said sawtooth waveform traverses the instantaneous magnitude of said analogue signal.

14. The arrangement of claim 1 wherein said valve means passes said predetermined pressure during marks in said binary signal and blocks said predetermined pressure during spaces in said binary signal.

15. The arrangement of claim 1 wherein said valve means passes said predetermined pressure during spaces in said binary signal and blocks said predetermined pressure during marks in said binary signal.

16. A load-dependent braking system comprising:
    fluid pressure control means for generating a fluid pressure which is dependent on a desired degree of braking of a vehicle;
    load sensor means for generating an analogue electric signal dependent on the load of the vehicle;
    electric signal conversion means coupled to said load sensor means for converting said analogue signal to a binary signal having a mark-to-space ratio dependent on the magnitude of said analogue signal;
    electrically operated fluid valve means coupled to said conversion means to alternately open and close a fluid valve in accordance with the marks and spaces in said binary signal;
    said fluid pressure control means being coupled to said fluid valve means to have said generated fluid pressure alternately passed and blocked by the opening and closing of said valve to produce an output of said fluid valve means which is dependent both on said desired degree of braking of a vehicle and on the load of said vehicle.

17. The system of claim 16 wherein said fluid pressure control means is a vehicle driver's foot-pedal brake control coupled to and operating a fluid pressure control valve in accordance with the degree of depression of the pedal.

18. The system of claim 17 wherein the output of said control valve is said generated fluid pressure and the pressure of said generated fluid pressure is proportional to the depression of said foot-pedal.

19. The system of claim 16 wherein the load sensor means comprises a strain-to-electrical transducer capable of modifying an electrical signal in dependence on the load.

20. The system of claim 19 wherein the dependency of said transducer on the load is proportional dependence.

21. The system of claim 16 wherein said fluid is a gas.

22. The system of claim 21 wherein said gas is air.

23. The system of claim 16 including a fluid capacity coupled to the output of said fluid valve means to dampen fluctuations in the pressure of said output.

24. The system of claim 16 including a fluid pressure amplifier means coupled to the output of the fluid valve means to amplify the fluid power of said output of said fluid valve means.

25. The system of claim 24 wherein said fluid pressure amplifying means is a self-lapping relay valve.

26. The system of claim 25 wherein said relay valve has a control volume coupled to receive the output of said fluid valve means, said control volume being dimensioned to present a fluid capacity for damping pressure fluctuations in the output of said fluid valve means.

27. The system of claim 26 wherein said control volume has a restrictive atmospheric vent for providing a continuous restricted venting of said control volume to atmosphere.

28. The system of claim 26 including a pressure sensitive valve means coupled to said fluid valve means and to said control volume for admitting pressurized fluid to said control volume when said fluid valve means is passing said predetermined pressure and for venting said control volume to atmosphere when said fluid valve means is blocking said predetermined pressure.

29. The system of claim 16 wherein said electric signal conversion means is a class-D amplifier.

30. The system of claim 16 wherein said electric signal conversion means comprises an oscillator means producing a sawtooth output waveform, comparison means for comparing the instantaneous magnitude of said sawtooth waveform with the instantaneous magnitude of the signal from said load sensor means, and switching means for switching the output of said electric signal conversion means between one binary level and another binary level each time the instantaneous magnitude of said sawtooth waveform traverses the instantaneous magnitude of said analogue signal.

31. The system of claim 16 wherein said valve means passes said predetermined pressure during marks in said binary signal and blocks said predetermined pressure during spaces in said binary signal.

32. The system of claim 16 wherein said valve means passes said predetermined pressure during spaces in said binary signal and blocks said predetermined pressure during marks in said binary signal.

* * * * *